United States Patent [19]

Vry

[11] Patent Number: 4,521,766
[45] Date of Patent: Jun. 4, 1985

[54] CODE GENERATOR

[75] Inventor: Michael G. Vry, East Grinstead, England

[73] Assignee: U.S. Philips Corporation, New York, N.Y.

[21] Appl. No.: 436,206

[22] Filed: Oct. 25, 1982

[30] Foreign Application Priority Data

Nov. 2, 1981 [GB] United Kingdom ............... 8132929

[51] Int. Cl.³ ............................................ H03K 13/24
[52] U.S. Cl. ............................... 340/347 DD; 375/17
[58] Field of Search ................... 340/347 DD, 825.57, 340/825.59; 235/310; 371/56; 375/17, 18, 19, 20; 360/40

[56] References Cited

U.S. PATENT DOCUMENTS

| 2,912,684 | 11/1959 | Steele | 340/347 DD |
| 2,954,267 | 9/1960 | Canepa | 340/347 DD |
| 3,505,644 | 4/1970 | Breant | 371/56 |

Primary Examiner—Charles D. Miller
Attorney, Agent, or Firm—Jack E. Haken; James J. Cannon, Jr.

[57] ABSTRACT

A code generator which produces a transmission code in response to a serial binary data stream applied to its input. The transmission code is similar to that know as WAL2 but whereas WAL2 involves a double frequency component when the binary data changes from '1' to '0' or vice versa the transmission code produced by the code generator holds the output signal constant at a level intermediate those corresponding to the binary '1' and '0'. This reduces the high frequency content of the transmitted signal and consequently reduces crosstalk between the channels. The code generator includes a first current source which is connected to a summing network through a first switch, a second current source which is connected to the summing network through a second switch and a control circuit which produces signals on lines to selectively operate the first and second switches.

6 Claims, 4 Drawing Figures

CODE GENERATOR

BACKGROUND OF THE INVENTION

1. Field of the Invention

The invention relates to a code generator for producing a transmission code in response to an input serial binary code and to a data transmission system including such a code generator.

DESCRIPTION OF THE PRIOR ART

For the baseband transmission of binary data in local telephone networks the transmitted signal should have a small low frequency content and since the signal will normally be required to pass through transformers there should be no d.c. component. This has been achieved by encoding the binary data before transmission to produce a code having the required properties. There are a number of codes which have the property of suppressing the lower frequencies but the most effective is that known as WAL2 (or top-hat) which has a second order zero in its spectrum at zero frequency (d.c.) and consequently the smallest low-frequency energy. However this code has a relatively large high frequency (greater than the bit frequency) content which leads to an increased sensitivity to crosstalk between different systems.

It is an object of the invention to provide a code generator for producing a transmission code having a lower high frequency content than WAL2 while retaining an acceptably small low frequency content.

2. Summary of the Invention

The invention provides a code generator for producing a transmission code in response to an input serial binary code having a bit period T, the code generator comprising means for generating a signal having a first value of a period T/2 located centrally in the bit period in response to a bit of one binary state, means for generating a signal having a second value for the period T/2 in response to a bit of the other binary state, means for generating a signal having the second value during the interval between the T/2 periods of successive bits when two consecutive bits are of the one binary state, means for generating a signal having the first value during the interval between the T/2 periods of successive bits when two consecutive bits are of the other binary state, and means for producing a signal having a value intermediate the first and second values during the interval between the T/2 periods of successive bits when two consecutive bits are of different binary states.

The code generator of the invention produces a transmission of code in which the double frequency cycle produced by the WAL2 code when the binary input changes state is replaced by a steady signal located midway between the two extreme values. In this way the high frequency content of the signal is reduced. A further property of the code is that the transmitted power is 75% of the peak power whereas for WAL2 it is 100% of the peak power. This is as a result of holding the signal at zero level for the interval between a 1 and a 0 or vice versa. This interval is half a bit period and 50% of such intervals are zero.

The main disadvantage is that the output is a three level signal and the encoder must have good linearity if the low frequency spectral characteristics is to be preserved.

The code generator may comprise a first current source connected by a first switch to a summing network, a second current source connected by a second switch to the summing network, the first and second current sources producing substantially equal currents, and a control circuit for operating the first and second switches; wherein to produce a signal of the first value the control circuit produces signals to close the first and second switches so that both current sources are connected to the summing network, to produce a signal of the second value the control circuit produces signals to open the first and second switches so that both current sources are disconnected from the summing network, and to produce a signal having the intermediate value the control circuit produces signals to close one of the first and second switches and to open the other of the first and second switches so that one of the current sources is connected to the summing network while the other of the current sources is disconnected from the summing network.

This provides a simple implementation for the code generator with the two extreme values determined by for the one extreme the sum of the current generators and for the other extreme zero current through the summing network. The intermediate value is determined by one or other of the two current sources which should be closely matched but a certain amount of imbalance is permissible since for a long train of symbols each current source will be utilised an equal number of times and the nominal zero level will take their average level.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
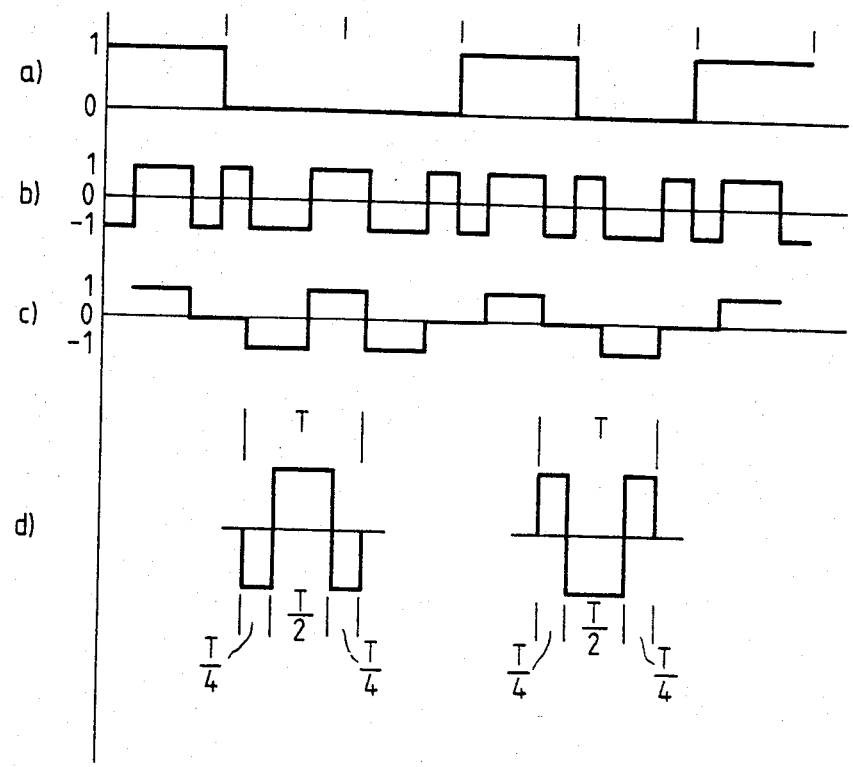
FIG. 1 shows a serial binary code encoded into the WAL2 code and into the code produced by the code generator according to the invention.

FIG. 1 illustrates waveforms used for transmitting binary data in the form of a continuous waveform and in terms of the symbols for each bit to be transmitted. FIG. 1(a) shows a serial binary code having the sequence 100101 while FIG. 1(b) shows that sequence encoded for transmission into a code known as WAL2. This name has been given to the code since the waveforms in the element period T, FIG. 1(d) can be defined in terms of 2nd-order Walsh Functions. The WAL2 code is described in a paper by R. J. Westcott and R. A. Boulter entitled "A Comparison of Modulation Systems for Data Transmission over Physical Pairs in a Synchronous Digital Data Network" published in International Symposium of Subscribers Loops and Services 1974, pages 7.4.1 to 7.4.9. As can be seen from FIGS. 1(a) and (b) whenever a charge from a binary 1 to a binary 0 or vice versa is required the WAL2 code produces a cycle at twice the bit frequency which increases the high frequency energy and leads to a greater sensitivity to cross talk between different systems.

Figure 2:
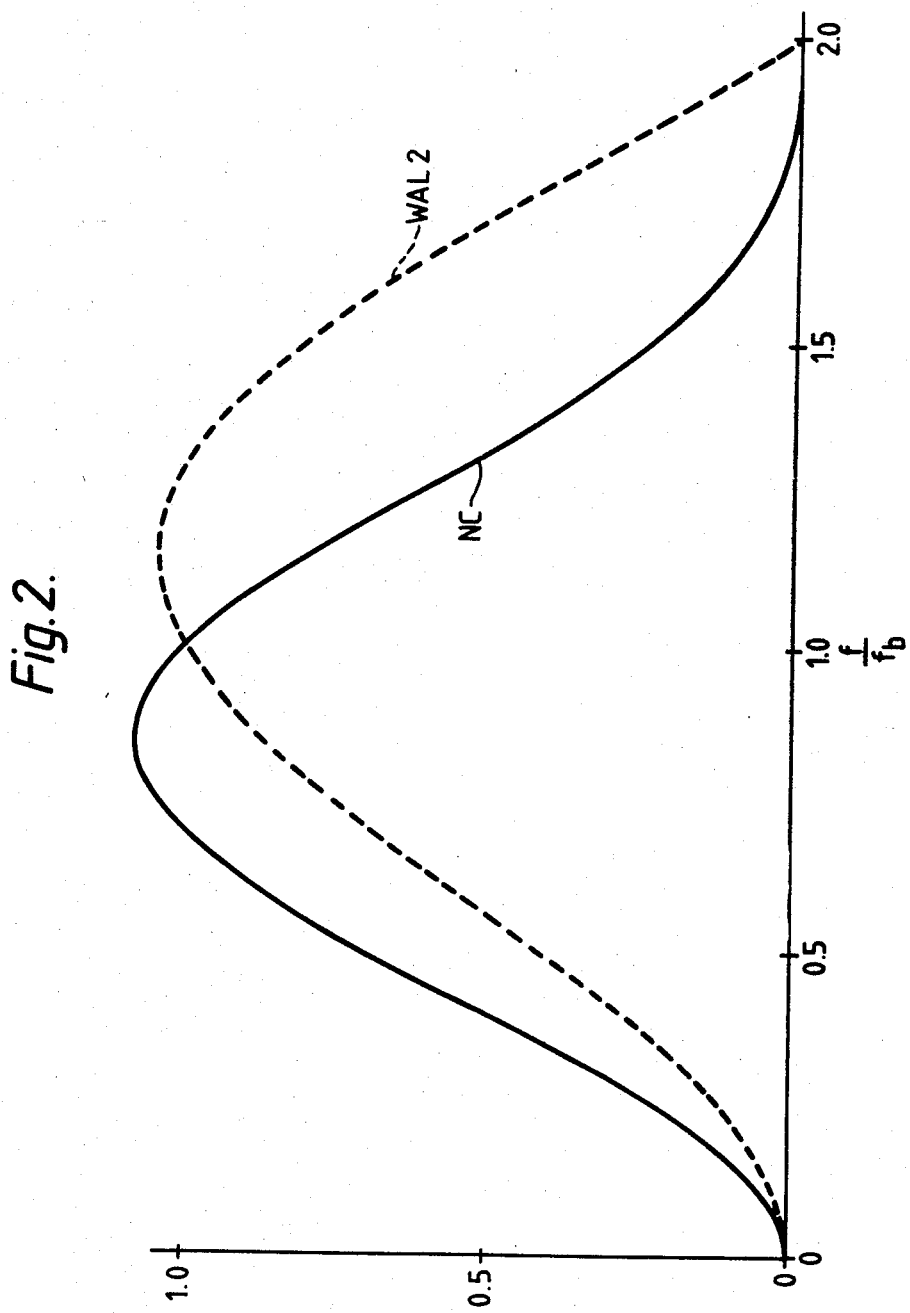
FIG. 2 shows the frequency spectrum of the WAL2 code and the code produced by the code generator according to the invention.

The code generator according to the invention produces a transmission code as shown in FIG. 1(c) in response to the binary code shown in FIG. 1(a). As can be seen from FIGS. 1(a) to (c) the double frequency cycle of the WAL2 code is replaced by holding the signal constant intermediate (0) the two extreme levels (1, −1). In this way the high frequency energy is reduced relative to the WAL2 code while the small low frequency content is substantially retained. FIG. 2 shows the frequency spectrum of the WAL2 code and that of the code (NC) produced by the code generator according to the invention. The substantial reduction in the high frequency component can be clearly seen from these spectra.

Figure 3:
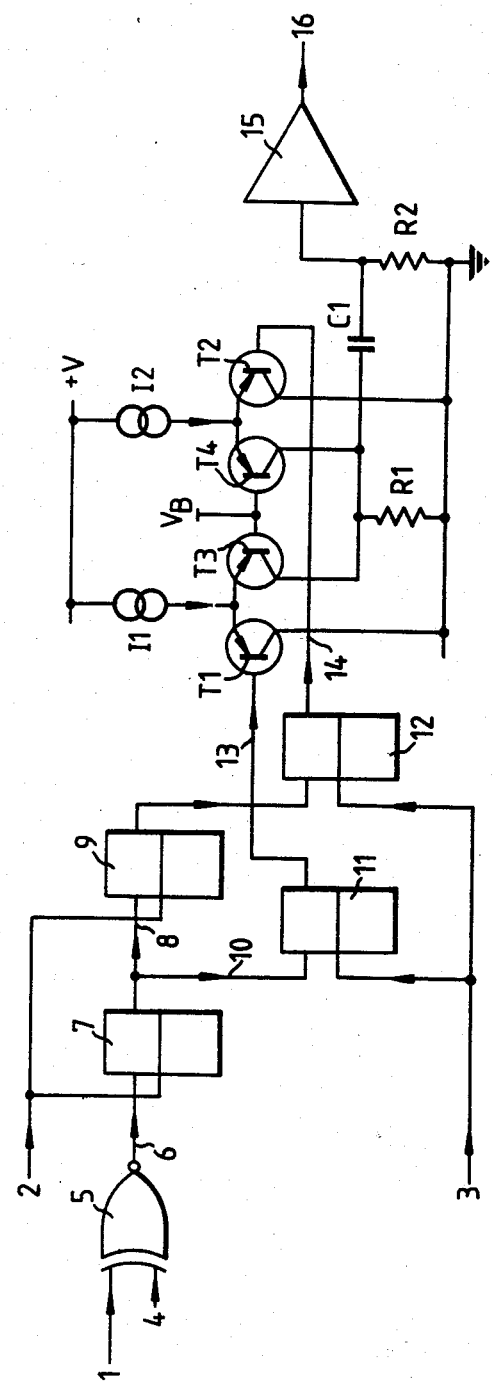
FIG. 3 is a schematic circuit diagram of a code generator according to the invention.
Figure 4:
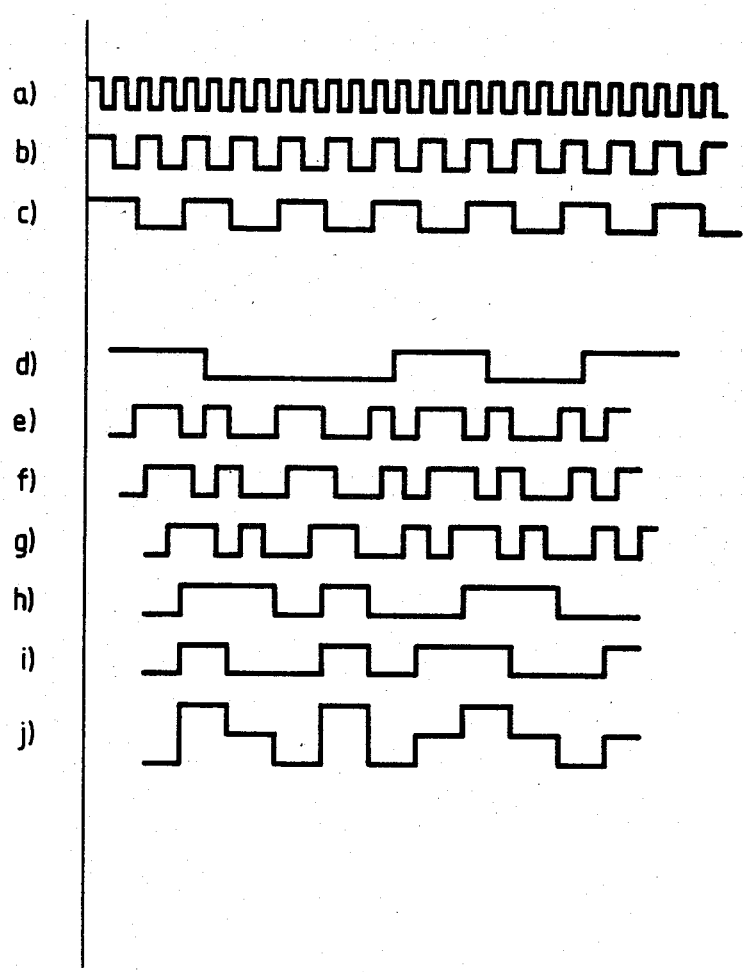
FIG. 4 illustrates the signals occurring at various points in the code generator shown in FIG. 3.

FIG. 3 shows an embodiment of a code generator according to the invention having an input 1 to which a binary code is applied. For the purpose of illustrating the operation of the code generator it will be assumed that the binary code applied to terminal 1 is of the form shown in FIG. 4(d). Three clock pulse trains as illustrated in FIGS. 4(a) (b) and (c) are applied to inputs 2, 3 and 4 respectively. Inputs 1 and 4 are connected to respective inputs of an exclusive NOR gate 5 which produces the waveform shown in FIG. 4(e) on line 6. The output of NOR gate 5 is fed via line 6 to the D input of a clocked D type bistable circuit 7 whose clock input is connected to the input 2. The Q output of the bistable 7 is connected via a line 8 to the D input of a clocked D type bistable circuit 9 and via a line 10 to the D input of a clocked D type bistable circuit 11. The input 2 is connected to the clock input of bistable 9 while the input 3 is connected to the clock input of bistable 11. The Q output of bistable 9 is connected to the D input of a clocked D type bistable circuit 12 whose clock input is connected to input 3. Bistables 7 and 9 form a two stage shift register with the Q output of bistable 7 providing the waveform 4(f) and the Q output of bistable 9 providing waveform 4(g). It can be seen from FIG. 4 that waveform 4(f) is waveform 4(e) delayed by one period of the clock 4(a) and waveform 4(a) is waveform 4(e) delayed by two periods of the clock 4(a). The Q output of bistable 11 which is shown as waveform 4(h) is fed via a line 13 to the base of a pnp transistor T1 while the Q output of bistable 12 which is shown as waveform 4(i) is fed via a line 14 to the base of a pnp transistor T2. The emitter of transistor T1 is connected to the emitter of pnp transistor T3 and via a constant current source I1 to a positive supply rail V. Similarly the emitter of transistor T2 is connected to the emitter of a pnp transistor T4 and via a constant current source I2 to the positive supply rail V. The collectors of transistors T1 and T2 are directly connected to ground while the collectors of transistors T3 and T4 are commoned and connected to ground via a resistor R1. The bases of transistors T3 and T4 are connected to a bias potential VB. The collectors of transistors T3 and T4 are additionally connected through a series capacitor C1 to the input of a line driver 15 whose output is connected to the output 16 of the code generator. The input of the line driver 15 is connected via a resistor R2 to ground.

The clock signals applied to inputs 2, 3 and 4 may be generated in known manner by means of an oscillator driving a chain of binary dividers. As can be seen from FIG. 4 clock signal 4(b) is half the frequency of clock signal 4(e) while clock signal 4(c) is half the frequency of clock signal 4(b). The period of the clock signal 4(c) is equal to the bit period T of the binary signal but is offset with respect to the bit periods by a period T/4. Thus the combination of the binary signal 4(d) with the clock signal 4(c) in the exclusive NOR gate 5 produces the WAL2 code as shown in waveform 4(e). The output of bistable 9, waveform 4(g) is delayed with respect to the output of bistable 7, waveform 4(f), by T/4 i.e. the period of the clock signal 4(a). The outputs of bistables 7 and 9 are clocked into the bistables 11 and 12 by the clock signal 4(c) and as a result the output of bistable 12 on line 14 is an inverted version delayed by T/2 of the output of bistable 11 on line 13.

The signals on lines 13 and 14 are used to form a three level signal by routing two nominally equal currents $I_1$ and $I_2$ into the summing resistor R1. Assuming that the bistables 11 and 12 are formed as TTL integrated circuits and VB is approximately +1.5 Volts a logic '1' on lines 13 and 14 will cause a current $I_1+I_2$ to flow into resistor R1, a logic '0' on lines 13 and 14 will prevent any current flowing into resistor R1, a logic '1' on the line 13 will cause a current of $I_1$ to flow into the resistor R1 and a logic '1' on the line 14 will cause a current of $I_2$ to flow into the resistor R1.

Thus the output of amplifier 15 will be of the form shown in FIG. 4(j). As can be seen from FIG. 4 the code produced by the code generator replaces the cycle at twice the bit frequency produced in the WAL2 code when the binary signal changes state by a constant level for half the bit period. This has the result of reducing the high frequency content of the transmitted signal while still retaining a second order zero at zero frequency.

The emitter coupled pair circuits formed by transistors T1 and T3 and transistors T2 and T4 act as first and second switches to switch the currents produced by the first and second current sources $I_1$ and $I_2$ into the summing network formed by resistor R1. The switches are controlled by signals on lines 13 and 14 generated by the control circuit comprising the exclusive NOR gate 5 and the D type bistable circuits 7, 9, 11 and 12. It would, of course, be possible to use alternative switching circuits in place of the emitter coupled pair circuits.

I claim:

1. A code generator for producing a transmission code in response to an input serial binary code having a bit period T, the code generator comprising means for generating a signal having a first value for a period T/2 located centrally in the bit period in response to a bit of one binary state, means for generating a signal having a second value for the period T/2 in response to a bit of the other binary state, means for generating a signal having the second value during the interval between the T/2 periods of successive bits when two consecutive bits are of the one binary state, means for generating a signal having the first value during the interval between the T/2 periods of successive bits when two consecutive bits are of the other binary state, and means for producing a signal having a value intermediate the first and second values during the interval between the T/2 periods of successive bits when two consecutive bits are of different binary states.

2. A code generator as claimed in claim 1, comprising a first current source connected by a first switch to a summing network, a second current source connected by a second switch to the summing network, the first and second current sources producing substantially equal currents, and a control circuit for operating the first and second switches; wherein to produce a signal of the first value the control circuit produces signals to close the first and second switches so that both current sources are connected to the summing network, to produce a signal of the second value the control circuit produces signals to open the first and second switches so that both current sources are disconnected from the summing network, and to produce a signal having the intermediate value the control circuit produces signals to close one of the first and second switches and to open the other of the first and second switches so that one of the current sources is connected to the summing network while the other of the current sources is disconnected from the summing network.

3. A code generator as claimed in claim 2, in which the summing network comprises a resistor.

4. A code generator as claimed in claim 2, comprising a line driver whose input is a.c. coupled to the summing network.

5. A code generator as claimed in claim 3, comprising a line driver whose input is a.c. coupled to the summing network.

6. A data transmission system comprising a transmitter, a receiver and a transmission medium in which the transmitter includes a code generator as claimed in claim 1.

* * * * *